United States Patent [19]

Reisch et al.

[11] Patent Number: 5,357,038

[45] Date of Patent: * Oct. 18, 1994

[54] PROCESS AND COMPOSITION FOR PROVIDING DOUBLE METAL CYANIDE CATALYZED POLYOLS HAVING ENHANCED REACTIVITY

[75] Inventors: John W. Reisch; Deborah M. Capone, both of Guilford; Ronald S. Blackwell, Waterbury, all of Conn.

[73] Assignee: Olin Corporation, Cheshire, Conn.

[*] Notice: The portion of the term of this patent subsequent to Nov. 30, 2010 has been disclaimed.

[21] Appl. No.: 114,860

[22] Filed: Sep. 2, 1993

Related U.S. Application Data

[63] Continuation-in-part of Ser. No. 923,647, Aug. 3, 1992, Pat. No. 5,266,681.

[51] Int. Cl.$^5$ .................. C08G 59/68; C08G 65/04
[52] U.S. Cl. .................. 528/414; 128/403; 128/410; 568/618; 568/620; 568/621; 568/624; 568/625
[58] Field of Search .............. 528/414, 403, 410; 568/618, 620, 621, 624, 625

[56] References Cited

U.S. PATENT DOCUMENTS

| | | | |
|---|---|---|---|
| 3,829,505 | 8/1974 | Herold | 260/611 |
| 3,941,849 | 3/1976 | Herold | 260/607 |
| 4,242,490 | 12/1980 | Emerson et al. | 528/77 |
| 4,335,188 | 6/1982 | Igi et al. | 428/458 |
| 4,355,188 | 10/1982 | Herold et al. | 568/620 |
| 4,472,560 | 9/1984 | Kuyper et al. | 526/120 |
| 4,477,589 | 10/1984 | van der Hulst et al. | 582/169 |
| 4,877,906 | 10/1989 | Harper | 568/621 |

OTHER PUBLICATIONS

Article entitled "Influence of Acids and Bases on Preparation of Urethane Polymers" by H. L. Heiss et al., vol. 51, No. 8, Aug. 1959.

Article entitled "Urethane Polyether Prepolymers and Foams–Influence of Chemical and Physical Variables on Reaction Behavior" by H. G. Scholten et al. vol. 5, No. 3, Jul. 1960.

*Primary Examiner*—John Kight, III
*Assistant Examiner*—Duc Truong
*Attorney, Agent, or Firm*—Dale L. Carlson

[57] ABSTRACT

The present invention relates to a process for improving the polyurethane-forming reactivity of a propylene oxide-based ethylene oxide-free polyol produced using a double metal cyanide complex catalyst by incorporating therein a minor amount of a base prior to employing the polyol in a polyurethane-forming reaction. Also claimed is the base-containing polyol composition produced in accordance with the present invention.

14 Claims, No Drawings

PROCESS AND COMPOSITION FOR PROVIDING DOUBLE METAL CYANIDE CATALYZED POLYOLS HAVING ENHANCED REACTIVITY

This application is a continuation-in-part of U.S. Ser. No. 07/923,647 filed Aug. 3, 1992, now U.S. Pat. No. 5,266,681.

FIELD OF THE INVENTION

This invention relates generally to polyols produced using double metal cyanide complex catalysts and, more specifically, to a process for improving the reactivity of double metal cyanide complex catalyzed polyols.

BACKGROUND OF THE INVENTION

The use of double metal cyanide complex ("DMC") catalysts in the preparation of polyols having low ethylenic unsaturation is well-established in the art, as illustrated, for example, by U.S. Pat. No. 3,829,505. The polyols prepared using these catalysts can be fabricated to have a higher molecular weight and/or a lower amount of end group unsaturation than can be prepared using commonly-employed potassium hydroxide ("KOH") catalysts. The '505 patent discloses that these high molecular weight polyol products are suitably reacted with polyisocyanates to prepare rigid or flexible polyurethanes.

Unfortunately, it has now been found by the present inventors that, when utilizing polyols other than ethylene oxide ("EO")-capped polyols, the reactivity of the polyols made with DMC catalysts is less than otherwise might be desired in the subsequent reaction of the polyol with an isocyanate to produce a polyurethane.

A solution to this problem of less-than-desired reactivity would be highly desired by the DMC-catalyzed polyol manufacturing community. The present invention provides one solution to this problem.

SUMMARY OF THE INVENTION

In one aspect, the present invention relates to a process for enhancing the reactivity of a polyol produced using a double metal cyanide catalyst which comprises contacting said polyol with at least a trace amount of a base (preferably an alkali metal hydroxide, alkali metal alkoxide, alkaline earth metal hydroxide, alkine earth metal alkoxide, or a combination thereof), said polyol being free of ethylene oxide capping.

In another aspect, the present invention relates to a process for producing a polyol characterized by enhanced reactivity toward polyisocyanates which comprises the steps of:
(a) forming a polyol having a backbone comprising moieties selected from the group comprising ethylene oxide, propylene oxide, and combinations thereof, said polyol being free of ethylene oxide capping;
(b) contacting said polyol with at least a trace amount of a base in order to provide a base-containing polyol characterized by enhanced reactivity toward polyisocyanates.

In yet another aspect, the present invention relates to a base-containing polyol product comprising a polyol made by double metal cyanide catalysis and having a equivalent weight of at least about 500 (advantageously at least about 1,000, more advantageously at least about 1,500) and a level of end group ethylenic unsaturation of no greater than 0.04 (preferably less than 0.02, more preferably less than 0.01) milliequivalents per gram of polyol and at least a trace amount of a base in order to provide a base-containing polyol characterized by enhanced reactivity toward polyisocyanates, said polyol being free of ethylene oxide capping.

These and other aspects will become apparent upon reading the following detailed description of the invention.

DETAILED DESCRIPTION OF THE INVENTION

It has now been surprisingly found that the reactivity of polyols made using a DMC catalyst toward polyols is significantly improved by incorporation of at least a trace amount of base into the polyol prior to the reaction of the polyol with a polyisocyanate to form a polyurethane. The resulting polyurethanes exhibit improved physical properties, e.g., improved tensile strength, elongation and/or tear strength, as compared to polyurethanes prepared using a DMC catalyst but not containing at least a trace amount of the base, as demonstrated by the working examples provided hereinbelow.

The DMC catalyst-prepared polyols of the present invention contain at least a trace amount of base, most preferably KOH or NaOH although other bases such as other alkali metal hydroxides, alkaline earth metal hydroxides, alkali metal alkoxides, alkaline earth metal alkoxides, and combinations thereof are also suitably employed. By "at least a trace amount of base" is meant at least 0.5 part per million ("ppm"), preferably at least 1.0 ppm, most preferably at least 1.5 ppm, of the base based upon the weight of the polyol. It is preferred that the amount of the base not exceed 10 ppm (more preferably not more than 5 ppm) based upon the weight of the polyol. The base-containing polyols of the present invention are particularly useful in the production of polyurethane sealants and elastomers, including thermoplastic and thermoset elastomers, as well as cast elastomers, although they also are suitably utilized in the production of polyurethane adhesives, coatings and foams as may be desired.

The polyurethanes made using the base-containing polyols of the present invention may be made by the prepolymer process or the one-shot process. The polyurethane isocyanate-terminated prepolymer that is utilized when employing the prepolymer process is prepared by reacting an organic polyisocyanate with a polyalkylene ether polyol(s) in an equivalent ratio of NCO to OH groups of from about 1.02/1 to about 15/1, using standard procedures, to yield an isocyanateterminated prepolymer of controlled molecular weight. Preferably, the NCO/OH ratio ranges from about 1.3/1 to about 5/1. The reaction may be accelerated by employing a catalyst; common urethane catalysts are well known in the art and include numerous organometallic compounds as well as amines, e.g., tertiary amines and metal compounds such as lead octoates, mercuric succinates, stannous octoate or dibutyltin dilaurate may be used. Any catalytic amount may be employed; illustratively, such amount varies, depending on the particular catalyst utilized, from about 0.01 to about 1 percent by weight of the polyurethane prepolymer.

Preferred base-containing polyols within the scope of the present invention are the polyether diols and the polyether triols, and combinations thereof. Suitable polyether triols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether triol reactant includes the following and mixtures thereof: the aliphatic triols such as glycerol, propoxylated glycerol adducts, trimethylolpropane, triethylolpropane, trimethylolhexane, and the like.

A preferred group of polyhydric initiators for use in preparing the polyether triol reactant is one which comprises triols such as glycerol, propoxylated glycerol adducts, trimethylolpropane and the like.

The polyether diols are prepared by an analogous reaction of alkylene oxide, or mixture of alkylene oxides with a polyhydric initiator. In this case the initiator is a diol such as ethylene glycol, 1,3-propylene glycol, dipropylene glycol, butylene glycols, butane diols, pentane diols, and the like.

A preferred group of polyhydric initiators for use in preparing the polyether diol reactant is one which comprises diols such as ethylene glycol, diethylene glycols, propylene glycol, dipropylene glycol, or water.

The alkylene oxide-polyhydric initiator condensation reaction is preferably carried out in the presence of a double metal cyanide catalyst. The use of a double metal cyanide catalyst rather than a base such as KOH during the preparation of the polyol provides distinct advantages in regard to the end group unsaturation level of the polyol produced. Without wishing to be bound by any particular theory, it is speculated by the present inventor that unsaturated end groups result in monofunctional species that act as chain stoppers in elastomer formation. In polyol synthesis with KOH catalysis the unsaturation formed increases as a direct function of equivalent weight. Eventually conditions are established wherein further propylene oxide addition fails to increase the molecular weight. In other words the use of alkali catalysts to produce high molecular weight, hydroxy terminated polyoxypropylene ethers results in a substantial loss in hydroxy functionality. With double metal cyanide catalysis much less unsaturation is formed allowing higher equivalent weight polyols to be prepared.

The double metal cyanide complex class catalysts suitable for use and their preparation are described in U.S. Pat. Nos. 4,472,560 and 4,477,589 to Shell Chemical Company and U.S. Pat. Nos. 3,941,849; 4,242,490 and 4,335,188 to The General Tire & Rubber Company. The teachings of the foregoing patents are incorporated herein by reference.

One double metal cyanide complex catalyst found particularly suitable for use is a zinc hexacyanometallate of formula:

Zn$_3$ [M(CN)$_6$]$_2$.xZnCl$_2$.yGLYME.zH$_2$O wherein M may be Co(III), or Cr(III) or Fe(II) or Fe(III); x, y, and z may be fractional numbers, integers, or zero and vary depending on the exact method of preparation of the complex.

In producing a polyurethane utilizing the base-containing polyols of the present invention, any suitable organic polyisocyanate, or mixture of polyisocyanates, may be used. Illustrative are toluene diisocyanate, such as the 80:20 and the 65:35 mixtures of the 2,4- and 2,6-isomers, ethylene diisocyanate, propylene diisocyanate, methylene-bis (4-phenyl) isocyanate (also referred to as diphenylmethane diisocyanate or MDI), xylene diisocyanate (XDI), isophorone diisocyanate (IPDI), 3,3'-bis-toluene-4,4'-diisocyanate, hexamethylene diisocyanate (HDI), hydrogenated MDI, hydrogenated XDI, and modified liquid MDI adducts such as carbodiimide-modified MDI, naphthalene-1,5-diisocyanate, the polymeric isocyanates such as polyphenylene polymethylene isocyanate (PMDI), mixtures and derivatives thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20, as well as MDI.

Chain extenders which can be utilized in preparing polyurethanes, particularly coatings, sealants, adhesives and elastomers, utilizing the base-containing polyols of the present invention include diols and diamines such as 4,4'-methylene bis(2-chloroaniline) ("MOCA"), butane diol, hexane diol, propylene glycol, bisphenol A, or polyalkylene oxide polyols with molecular weights between 100–2,800, or the prepolymer can be moisture cured with water. The chain extenders can also be triols such as glycerine, trimethylol propane, or propoxylated adducts of glycerine or trimethylol propane or amines like diethyltoluene diamine, ethylene diamine, substituted aromatic diamines such as the product commercially available as UNILINK 4200, a product of UOP, Inc, triisopropyl amine, methylene bis(orthochloro-aniline), N,N-bis(2-hydroxypropyl)-aniline which is commercially available as ISONOL 100, a product of Dow Chemical Corp., and the like, and combinations thereof. Preferred chain extenders include MOCA, butane diol, trimethylol propane, diethyltoluene diamine, N,N-bis(2-hydroxypropyl)-aniline, and combinations thereof. The chain extension can be conducted either in situ during the prepolymer formation or in a separate reaction step.

In preparing the polyurethanes utilizing the base-containing polyols of the present invention, the polyol(s), polyisocyanate(s), chain extender(s), and other components are reacted, typically under conditions of an elevated temperature. Urethane forming catalysts can be used as well as antioxidants or other antidegradants. The urethane-forming components may be mixed with the usual compounding ingredients, e.g. plasticizers, adhesion promoters, fillers and pigments like clay, silica, fumed silica, carbon black, talc, phthalocyanine blue or green, TiO$_2$, U-V absorbers, MgCO$_3$, CaCO$_3$ and the like. The compounding ingredients, such as fillers, are suitably employed in the elastomer in an amount of between 0 and about 75 weight percent based upon the weight of the elastomer. The polymerization reaction may be carried out in a single reaction (one-shot process), or in one or more sequential steps (prepolymer process). In the one-shot process, all the isocyanate-reactive components are reacted simultaneously with the polyisocyanate. In such process, it is normal practice to blend all components except the polyisocyanate into a "B-side" mixture, which is then reacted with the polyisocyanate to form the polyurethane and/or polyurea elastomer. However, the order of mixing is not critical as long as the components do not undesirably react before all components are present. The reaction mixture is usually then placed in a mold and cured at a suitable temperature. The apparatus used for blending and molding is not especially critical. Hand mixing, conventional machine mixing, and the so-called reaction injection molding (RIM) equipment are all suitable. In the prepolymer process, all or a portion of one or more of the isocyanate reactive materials is reacted with a stoichiometric excess of the polyisocyanate to form an isocyanate-terminated prepolymer. This prepolymer is then allowed to react with the remaining isocyanate-reactive materials to prepare the polyurethane and/or polyurea elastomer. The prepolymer can be prepared with either the polyether or the chain extender, or a mixture of both.

As used herein, the term "molecular weight" is intended to designate number average molecular weight. The term "equivalent weight" designates the molecular weight divided by the number of hydroxyl groups per molecule of polyol.

While the invention has been described above with reference to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

EXAMPLE 1

A. Preparation of a Polyol with a Double Metal Cyanide Catalyst

A propoxylated glycerine precursor 100 g (133.6 eq. wt., 0.748 eq.) was added to a 1 liter autoclave. Zinc hexacyanocolbate (0.1 g) was added and the autoclave was flushed with nitrogen three times. The mixture was heated to 100° C. Propylene oxide (30 g) was added and it reacted as evidenced by a drop in pressure. PO was fed into the reactor at a rate to maintain the pressure below 30 psi and 609.0 g of propylene oxide was added within two hours. At this point 548 g of the mixture was removed to allow space for more epoxide leaving 162. grams in the reactor. An additional 340 grams of propylene oxide were fed into the reactor over a period of 1.5 hours to produce a polyol with a molecular weight of 10,000, hydroxyl number 16.8. Using a similar procedure, polyols with hydroxyl numbers between 16 and 60 were prepared. Diols were prepared by starting with dipropylene glycol based precursors instead of glycerine based precursors.

B. Polyol Treatment with Hydrogen Peroxide to Remove the DMC Catalyst Using the Process Described in U.S. Pat. No. 5,099,075

A polyol (500.0 g) prepared as described in Example 1A containing residual DMC catalyst was heated to 100° C. and 30% hydrogen peroxide (3.0 g, 0.2 wt. % peroxide) was added. The mixture was heated at 100° C. for one hour and then Celite (10.0 g, 2 wt. %) was added and the mixture was vacuum stripped for one hour and filtered. A clear polyol containing 0 ppm cobalt and 0 ppm zinc was obtained.

C. Proposed Alternative Polyol Treatments for Removal of the DMC Catalyst

As alternatives to the removal of residual DMC catalyst from the polyol using hydrogen peroxide, as described in Example 1, Part B above, other methods to remove the residual DMC catalyst and catalyst residues are suitably employed. By way of illustration, an organic peroxide such as t-butyl peroxide is suitably substituted for the hydrogen peroxide following the procedure described in the Example 1, Part B. Other methods for removing residual DMC catalyst and catalyst residues are known, such as treatment of the DMC residue-containing polyol with other oxidants such as air, oxygen, or acids as described in more detail in U.S. Pat. No. 5,099,075; treatment with a strong base followed by ion exchange or neutralization with a mineral acid and filtration as described in U.S. Pat. No. 4,355,188; treatment with an alkali metal hydride as described in U.S. Pat. No. 4,721,818; treatment with alkali metal compounds (such as alkali metal alkoxides, alkali metal hydroxides or alkali metal hydrides) and phosphorous compounds (such as pyrophosphorous acid, phosphorous acid or hypophosphorous acid) to precipitate residual catalyst from the polyol as described in U.S. Pat. No. 4,877,906; or treatment with a buffer or chealating agent plus buffer as described in U.S. Pat. No. 4,987,271.

EXAMPLE 2

Sealants Prepared with DMC Catalyzed Polyol and Adjusted Reactivity DMC Catalyzed Polyol A. Prepolymer Preparation: TDI-80 22.86 g, 0.262 eq. and a 10,000 molecular weight triol prepared as described in example 1 (270.0 g, OH no. 17.3, 0.0833 eq.) were added to a flask under nitrogen and heated to 80° C. for 5 hours with stirring. The percentage of free NCO was measured and found to be 2.40%.

B. Sealant Preparation: A prepolymer prepared as described in example 2A (106.0 g, 0.0606 eq.), POLY-G ® 20-56 polyol (58.7 g, 1020 eq. wt., 0.0576 eq., 105 index), and dried fibrous talc (40.9 g) were mixed on a high speed mixer for several minutes. The mixture was degassed and T-10 stannous octoate catalyst 0.724 g was added. The mixture was stirred under vacuum for two minutes and then poured between glass plates with a ⅛" spacer and cured at 70° C. for 16 hours. The sealant was aged at 20° C. and 50% relative humidity for one week before testing.

C. Polyol Reactivity Adjustment: Low levels of KOH (0.935, 1.87, 2.82 ppm) were added to a 10,000 mw triol that was prepared as described in example one. The polyol was vacuum dried at 110° C. for 2 hours and then used to prepare sealants as described above in example 2a & b. Properties obtained with the adjusted reactivity polyols and the unadjusted polyol are compared in Table 1 below:

TABLE I

Two Component Talc Filled Sealants, TDI/10,000 mw Triol Prepolymers 2.4% free NCO, Extended with 2000 mw Diol

| KOH added to polyol | T-10 catalyst grams | Modulus 300% Elong. | Ult. Tensile | Elongation % | Shore A Hardness |
|---|---|---|---|---|---|
| 0 | 0.724 | Too soft to test | | | 5 |
| 0.935 ppm | 0.743 | 77 | 310 | 2390 | 20 |
| 1.87 ppm | 0.73 | 50 | 300 | 3950 | 20 |

TABLE I-continued

Two Component Talc Filled Sealants, TDI/10,000 mw
Triol Prepolymers 2.4% free NCO, Extended with 2000 mw Diol

| KOH added to polyol | T-10 catalyst grams | Modulus 300% Elong. | Ult. Tensile | Elongation % | Shore A Hardness |
|---|---|---|---|---|---|
| 2.82 ppm | 0.66 | 164 | 250 | 630 | 40 |

The above data show that when no base was added to the polyol a soft sealant (Shore A hardness 5) that was too soft to test was obtained. When small levels of base were added to the polyol sealants with higher hardness (20–40 Shore A) and excellent tensile elongation properties were obtained.

EXAMPLE 3

Cast Elastomers Prepared with DMC Catalyzed Polyols and with Adjusted Reactivity DMC Catalyzed Polyols 3A. A 2000 molecular weight diol was prepared with DMC catalyst using a propoxylated dipropylene glycol precursor using the procedure described in Example 1a. The polyol was treated with hydrogen peroxide as described in example 1b and the cobalt and zinc were completely removed from the polyol.

The reactivity of the polyol was adjusted by adding varying levels of KOH (1.87, 2.81, 3.74 ppm). The polyols were vacuum dried at 110° C. for two hours to remove water.

3B. Prepolymer preparation: Diphenyl methane diisocyanate (MDI) was melted in an over at 50° C. The polyol 400 g, 0.4 eq. were added to a flask under nitrogen and heated to 60° C. MDI (148.0 g, 1.18 eq.) was added and the mixture was heated to 80° C. for 2.5 hours with stirring under nitrogen. The percentage of free NCO was measured and found to be 6%.

3C. Elastomer Preparation: The prepolymer described in example 3B above 200 g, 0.286 eq. and dried butane diol 12.5 g, 0.277 eq., 103 index and Cocure 30 catalyst 0.32 g were mixed on a high speed mixer for 15-20 seconds at 3000-4000 rpm. The mixture was degassed in a vacuum desicator until the surface was bubble free. The mixture was poured between glass plates using a ⅛" spacer and cured in an oven at 100°-105° C. for 16 hours. The elastomers were aged at 50% relative humidity for one week before testing.

Physical properties of the elastomers obtained with the adjusted reactivity polyols compared to the unadjusted polyol are presented in Table 2 below:

TABLE II

Physical Properties of Elastomers Prepared with Adjusted Reactivity DMC Catalyzed Polyols Compared to Unadjusted Polyol. MDI/2000 mw diol prepolymers, 6% free NCO, extended with butane diol.

| ppm KOH added to DMC polyol | Shore A Hardness | 100% Modulus | Tensile Strength | Elong. % | Tear Die-C | Comp. Set % |
|---|---|---|---|---|---|---|
| 0 | 70 | 349 | 813 | 479 | 194 | 39 |
| 1.87 | 68 | 353 | 1684 | 850 | 286 | 38 |
| 2.81 | 68 | 349 | 2554 | 654 | 245 | 32 |

The above data showed that small amounts of base added to the double metal cyanide catalyzed polyol dramatically improved the tensile strength, elongation and tear strength of the elastomers.

While the invention has been described above with references to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

What is claimed is:

1. A process for enhancing the reactivity of a polyol produced using a double metal cyanide catalyst which comprises, after removing any residual double metal cyanide catalyst, contacting said polyol with between 0.5 and 10 ppm, based upon the weight of said polyol, of a base selected from the group consisting of an alkali metal hydroxide, alkali metal alkoxide, alkaline earth metal hydroxide, alkaline earth metal alkoxide, and combinations thereof, said polyol being free of ethylene oxide capping, wherein said removing of residual double metal cyanide catalyst is effected by treating the polyol with a treating agent which is an oxidant other than hydrogen peroxide.

2. The process of claim 1 wherein said removing of residual double metal cyanide catalyst is effected by treating the polyol with a treating agent which is selected from the group consisting of organic peroxides, air, oxygen, acids, and combinations thereof.

3. The process of claim 1 wherein said removing of residual double metal cyanide catalyst is effected by treating the polyol with a base which is selected from the group consisting of alkali metal hydroxides, alkaline earth metal hydroxides, alkali metal hydrides, alkaline earth metal hydrides, alkali metal alkoxides, alkaline earth metal alkoxides, and combinations thereof.

4. A process for producing a polyol characterized by enhanced reactivity toward polyisocyanates which comprises the steps of:
(a) forming a polyol having a backbone comprising moieties selected from the group comprising ethylene oxide, propylene oxide, and combinations thereof, said polyol being produced using a double metal cyanide catalyst and being free of ethylene oxide capping, and removing any residual double metal cyanide catalyst;
(b) contacting said polyol with between 0.5 and 10 ppm of a base in order to provide a base-containing polyol characterized by enhanced reactivity toward polyisocyanates, wherein said removing of residual double metal cyanide catalyst is effected by treating the polyol with a treating agent which is an oxidant other than hydrogen peroxide.

5. The process of claim 4 wherein said removing of residual double metal cyanide catalyst is effected by treating the polyol with a treating agent which is selected from the group consisting of organic peroxides, air, oxygen, acids, and combinations thereof.

6. The process of claim 4 wherein said removing of residual double metal cyanide catalyst is effected by treating the polyol with a base which is selected from the group consisting of alkali metal hydroxides, alkaline earth metal hydroxides, alkali metal hydrides, alkaline earth metal hydrides, alkali metal alkoxides, alkaline earth metal alkoxides, and combinations thereof.

7. A base-containing polyol product comprising a polyol product comprising a polyol made by double metal cyanide catalysis and having a equivalent weight of at least about 500 and a level of end group ethylenic unsaturation of no greater than 0.04 milliequivalents per gram of polyol and at least a trace amount of a base in order to provide a base-containing polyol characterized by enhanced reactivity toward polyisocyanates, said polyol being free of ethylene oxide capping.

8. The composition of claim 7 wherein said polyol has a equivalent weight of at least about 1,000.

9. The composition of claim 7 wherein said polyol has a equivalent weight of at least about 1,500.

10. The composition of claim 7 wherein said polyol has an end group ethylenic unsaturation of less than 0.02 milliequivalents per gram of polyol.

11. The composition of claim 7 wherein said polyol has an end group ethylenic unsaturation of less than 0.01 milliequivalents per gram of polyol.

12. The composition of claim 7 wherein said base is an alkali metal hydroxide.

13. The composition of claim 7 wherein said base is potassium hydroxide.

14. The composition of claim 1 wherein said trace amount is at least 0.5 ppm of said base.

* * * * *